United States Patent [19]

Rieder et al.

[11] Patent Number: 5,205,049
[45] Date of Patent: Apr. 27, 1993

[54] LENGTH MEASURING APPARATUS

[75] Inventors: Heinz Rieder, Oberndorf; Max Schwaiger, Ostermiething, both of Austria

[73] Assignee: RSF-Elektronik Gesellschaft m.b.H., Tarsdorf, Austria

[21] Appl. No.: 766,635

[22] Filed: Sep. 26, 1991

[30] Foreign Application Priority Data

Oct. 5, 1990 [AT] Austria ................................ 2014/90

[51] Int. Cl.[5] .............................................. G01B 7/02
[52] U.S. Cl. .......................................... 33/703; 33/705; 33/706
[58] Field of Search ............... 33/703, 705, 704, 700, 33/706, 707, 708

[56] References Cited

U.S. PATENT DOCUMENTS

| 3,658,429 | 4/1972 | Zipin | 33/707 |
| 3,867,037 | 2/1975 | Litke | 33/707 |
| 4,070,759 | 1/1978 | Nelle | 33/705 |
| 4,523,381 | 6/1985 | Narimatsu et al. | 33/700 |
| 4,777,361 | 10/1988 | Affa | 33/707 |
| 4,818,111 | 4/1989 | Affa | 33/707 |
| 4,908,953 | 3/1990 | Walliser | 33/706 |

FOREIGN PATENT DOCUMENTS 3824751 1/1990 Fed. Rep. of Germany .

Primary Examiner—Thomas B. Will
Attorney, Agent, or Firm—Collard & Roe

[57] ABSTRACT

A length measuring apparatus comprises a measuring device for detecting the position of a marker along a measuring path. The measuring device and the marker are encapsulated in a hermetically sealed housing. A follow-up device is provided for moving the marker to a predetermined position of registration relative to a detectable point, which is disposed outside the housing and is movable along a path which is parallel to and laterally aligned with the measuring path. The follow-up device comprises a device for establishing a non-contacting link between the detectable point and the marker. To provide such an apparatus which has a relatively simple design and a low susceptibility to disturbance and can achieve a high accuracy of measurement. The apparatus comprises a strip that is trained around reversing end pulleys and has a course that extends along the measuring path. The marker is carried by the course. The strip is adapted to be driven by the follow-up device and is provided with a measuring scale and in the housing extends past a stationary reader for reading the measuring scale.

7 Claims, 2 Drawing Sheets

LENGTH MEASURING APPARATUS

BACKGROUND OF THE INVENTION

1. Field of the Invention

This invention relates to a length measuring apparatus comprising measuring means for detecting the position of a marker along a measuring path, a hermetically sealed housing, in which said measuring means and said marker are encapsulated, follow-up means for establishing a non-contacting link between the marker and a detectable point, which is disposed outside the housing and is adjustable relative to the housing along the measuring path and for moving said marker to a position of registration relative to said detectable point.

2. Description of the Prior Art

Such a length measuring apparatus is known from DE-A-38 24 751. The basic advantage of such measuring apparatus resides in that the delicate parts of the measuring apparatus are perfectly protected in the housing in which they are accommodated so that damage or disturbances by dirt, moisture and aggressive fluids will be precluded and, as a result, even highly sensitive measuring means can be used at hazardous locations. The measuring means preferably generate electric measured-value signals, which are delivered by means of lines, which extend through sealed passages out of the housing, to means analyzing or displaying the signals. The follow-up means may consist of one or more transmitter-receiver systems, which are associated with the marker and the detectable point and which generate signals in response to the occurrence of a deviation from a predetermined position of registration. Said signals are shaped by control means and are subsequently used to control the means for driving the marker. Friction wheel drives operated by stepping motors may be employed. It is known to provide optoelectronic or magnetic or inductive or capacitive transmitter-receiver combinations or sensor systems consisting of pairs of associated elements for generating control signals in dependence on the deviation from registration. It will readily be possible to provide only one element of a pair thereof as an element which can be activated and for this purpose is provided with a power supply, illuminating means and receivers, and to provide the other element as a passive receiver or reflector or, in case of a magnetic coupling, to provide one element of the pair of sensors as a permanent magnet, by which a signal that depends on the deviation from registration is generated, e.g., in the other element of the pair. It is desired to effect a follow-up movement with the least possible time lag so that, e.g., the marker will follow with the shortest possible time lag the movement of the detectable point, which is provided at a defined location on a moving member of a machine. In optoelectronic pairs of sensors a suitable part of the housing must be permeable to the radiation which is employed and at least that part of the housing which is disposed between the marker and the detectable point and lies in the range of the displacement of the marker must be permeable as uniformly as possible to the flux used for the detection. The accuracy of the registration and the speed of the response of the follow-up means can be increased by the use of a plurality of pairs of sensors. In the known length measuring apparatus of the kind described first hereinbefore a stationary scale member carrying a measuring scale is provided within the hermetically sealed housing and a scanning device is provided for scanning said scale member and for generating sample or measured-value signals. That scanning unit is displaceable by the follow-up means along the stationary scale member. For this purpose it is possible to provide a drive unit, which comprises a stepping motor or another motor and friction wheels or other means for supporting the unit within the housing. Said friction wheels may be included in a wheeled carriage for displacing the drive unit along the scale member. To ensure a fast start in that the inertia will be overcome quickly and also to ensure the point-for-point alignment of the scanning unit with the detectable point, a controllable piezoelectric element may be included in a coupling provided between the carriage and the scanning unit. In that prior art a relatively high overall expenditure will be required if an exact follow-up control is to be effected and the relatively large mass forces are to be overcome which will inherently be involved in the operation of said known length measuring apparatus.

SUMMARY OF THE INVENTION

It is an object of the invention to provide a length measuring apparatus which is of the kind described first hereinbefore and which has a relatively simple overall design and low susceptibility to disturbance and a relatively high accuracy of measurement.

The object set forth is accomplished in that the housing contains a strip, which is trained around end pulleys or end winding rollers and has a tensioned course extending over the length of the measuring path and carrying the marker. The follow-up means comprises drive means operatively connected to the strip and operable to move the marker by means of the strip along the measuring path, and means for detecting the extent and direction of any deviation of the mark from the predetermined position of registration relative to the detectable point, the detecting means transmitting a control signal to the drive means to move the strip and keep the marker at the predetermined position of registration relative the detectable point.

The strip may be a steel strip or a toothed strip having a very small tooth pitch. In the apparatus in accordance with the invention it is no longer necessary to supply driving power to means moving within the housing by lead-through means moving along the measuring path but the drive may be transmitted into the housing from parts which are stationary relative to the housing and it will be sufficient to transmit to the control device the measured-value signals by which the registration is indicated.

Various structural designs may be adopted within the scope of the invention. In one version the strip may consist of an endless belt, which is trained around end reversing pulleys, at least one of which is driven. Alternatively, driveable winding rolls may be provided at opposite ends of the strip course which carries the marker and may be operated to move the marker in mutually opposite directions.

The need for an adjustable scanning unit may be eliminated in various ways. In one version the strip is provided with a measuring scale and is moved within the housing past a stationary reader for reading that measuring scale, which may consist of an absolute measuring scale or of an incremental measuring scale. In that case the measuring scale can be read in accordance with all suitable known scanning methods, such as optoelectronic, capacitive, inductive or magnetic methods.

In another version the strip may additionally be designed as stated above, in order to increase the accuracy of measurement, and may be moved past a scanning unit, and a roller for driving the strip is adapted to be driven in a controlled manner as a part of the follow-up means and comprises or drives a resolver which constitutes the measuring means. If a stepping motor is used to drive the strip, the control signals which are generated during the follow-up operation and control respective steps of the stepping motor may be counted and may be summed in dependence on the sense of rotation and in that case the distance travelled can be derived from the counted number of steps. The external design of the housing and the design of the measuring location and of the marker can be determined in dependence on the requirements in each case.

DETAILED DESCRIPTION OF THE PREFERRED EMBODIMENTS

Figure 1:
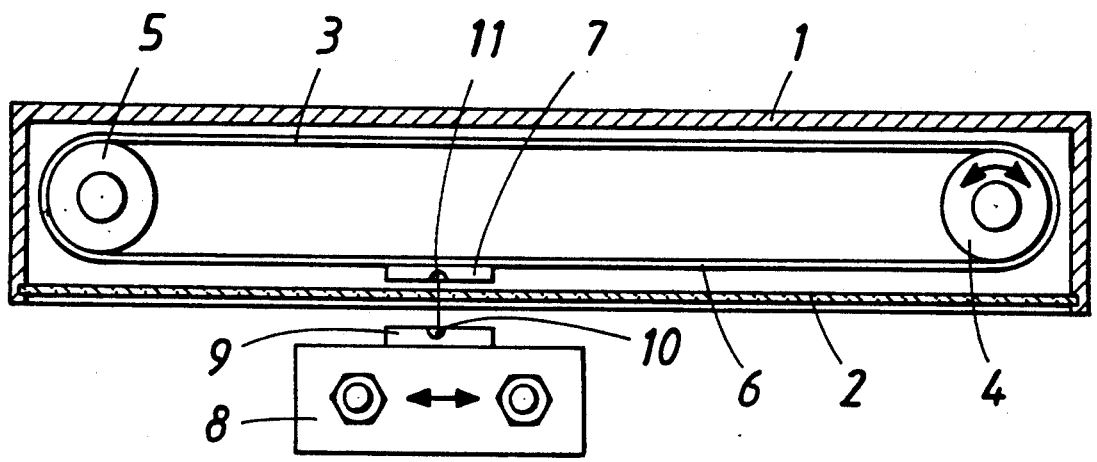
FIGS. 1 to 4 are schematic longitudinal sectional views showing respective illustrative embodiments of a length measuring apparatus in accordance with the invention.

Further details and advantages of the invention will become apparent from the following description of embodiments with reference to the drawing.

Each of the illustrated embodiments comprises a hermetically sealed housing 1 which adjacent to a measuring path comprises a wall 2, which permits a non-contacting link to be established between a transmitter and a receiver and in case of an optical link consists, e.g., of light-transmitting material. A taut endless strip 3 or 3a extends in the housing between a drive pulley 4 and a reversing pulley 5 and has a course 6, 6a, which extends along the measuring path and carries a tensioned marker 7.

A body 8 is provided outside the housing and in front of the wall 2 and may be connected, e.g., to a movable member of a machine-tool. The longitudinal displacement of the body 8 is to be measured by means of the length measuring apparatus. In the embodiments shown in FIGS. 1, 2 and 4, the body 8 carries a transmitter 10, which defines the point 9, and the marker 7 is connected to an associated receiver 11. In the embodiment shown in FIG. 3 the receiver 11 and the transmitter 10 are mounted on the marker 7 and the detectable point 9a is defined by a mirror 12. The direction in which a light ray or light beam emitted by the transmitter 10 is reflected by the mirror 12 will vary in dependence on the extent and direction of a deviation from a predetermined desired position or registration of the marker and of the detectable point relative to each other. The signals received by the receiver 11 are converted to electric signals, which are delivered to control means (not shown), which generate signals for controlling a motor for driving the drive pulley 4. That motor may consist of a stepping motor. That arrangement constitutes follow-up means, by which the marker is automatically moved to the desired position of registration relative to the detectable point on the moved body 8.

In the embodiment shown in FIG. 1 the drive pulley 4 constitutes or is coupled to a resolver, by which the displacement of the marker 7 is measured and corresponding indicating or control signals are delivered.

Figure 2:
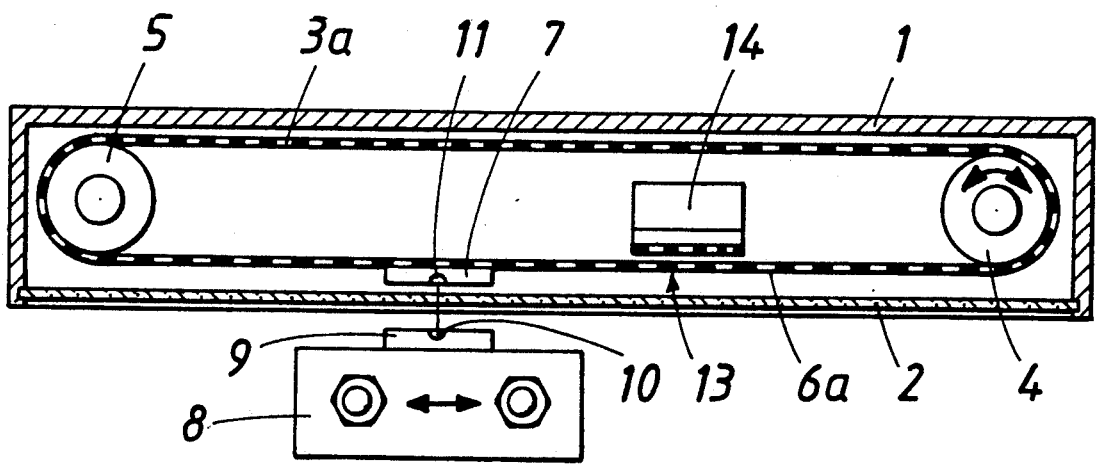
Figure 3:
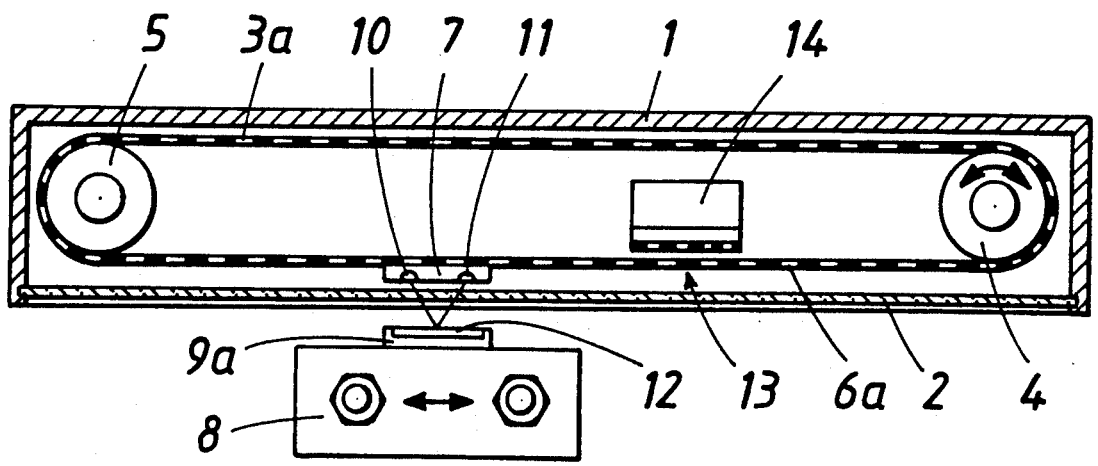

In the embodiment shown in FIGS. 2 and 3 the strip 3a is provided with a measuring scale 13 and is pulled past a stationary scanning or reading unit 14, which is mounted within the housing. The result of the measurement or the measured-value or countable signals from which the result of the measurement can be derived are delivered by the unit 14.

Figure 4:
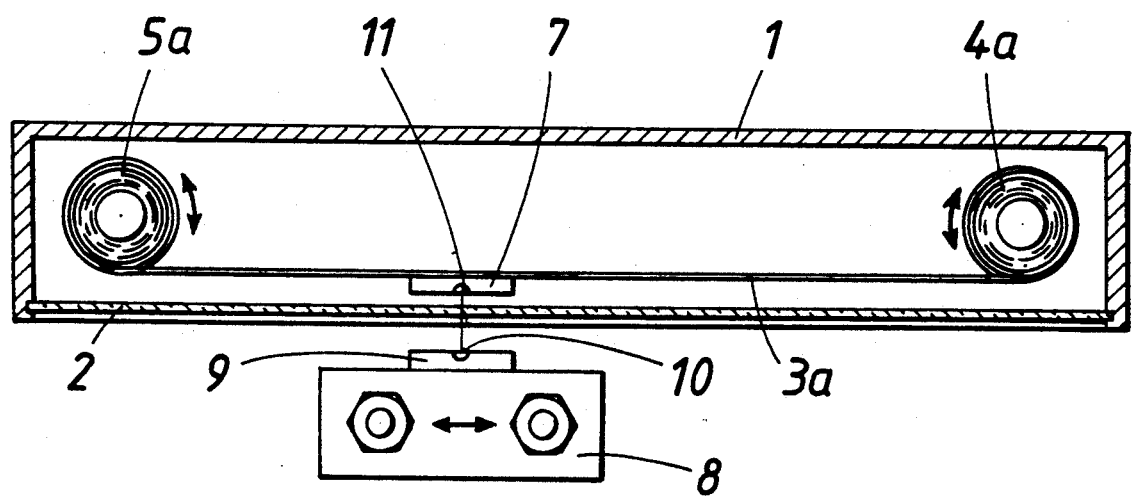

FIG. 4 shows a modification of the embodiment of FIG. 1, wherein pulleys 4a and 5a are driven. The tensioned course of strip 3a extends between the pulleys and the strip is movable in opposite directions as it is reeled up on one of the pulleys and unwound from the other pulley, depending on the direction of rotation of the pulleys. As one of the pulleys is driven in one direction to reel up the strip on this pulley, the other pulley is driven at the same speed in the opposite direction to unwind the strip while holding the course under tension.

We claim:

1. In a length measuring apparatus for indicating the position of a detectable point on a member movable to move said detectable point along a first linear path, which apparatus comprises
    a hermetically sealed housing,
    a marker mounted within said housing to be movable along a predetermined linear measuring path having opposite ends,
    said housing being adapted to be mounted so that said measuring path is parallel to and laterally aligned with said first path,
    follow-up means for moving said marker along said measuring path to a predetermined position of registration relative to said detectable point, which follow-up means comprises means for establishing a non-contacting link between said detectable point and said marker, and
    measuring means mounted within said housing for indicating the position of said marker along said measuring path,
    the improvement comprising
    two rotatably mounted rollers disposed in said housing beyond opposite ends of said measuring path and a strip extending between and around said rollers in contact therewith and having a tensioned course which extends along said measuring path and carries said marker,
    said follow-up means comprises drive means operatively connected to said strip and operable to move said marker by means of said strip along said measuring path, and means for detecting the extent and direction of any deviation of said marker from said predetermined position of registration relative to said detectable point, the detecting means transmitting a control signal to the drive means to move the strip and keep the marker at the predetermined position of registration relative to the detectable point.

2. The improvement set forth in claim 1, wherein said drive means are operatively connected to said strip by means of at least one of said rollers.

3. The improvement set forth in claim 2, wherein
    said strip consists of an endless belt trained around said two rollers, and
    said drive means are operatively connected to one of said rollers.

4. The improvement set forth in claim 2, wherein said strip is wound on both said rollers and
    said drive means are operatively connected to both said rollers.

5. The improvement set forth in claim 2, wherein said measuring means comprises a resolver operatively connected to said one roller which is operatively connected to said drive means.

6. The improvement set forth in claim 5, wherein said resolver is incorporated in said one roller.

7. The improvement set forth in claim 1, wherein the tensioned course of said strip is provided with a measuring scale extending along said measuring path, forming part of said measuring means, said measuring means further including a stationary reader for reading said measuring scale being mounted within said housing and said tensioned course provided with said measuring scale extends past said reader.

* * * * *